(12) United States Patent
Paulus et al.

(10) Patent No.: US 11,373,251 B1
(45) Date of Patent: Jun. 28, 2022

(54) SYSTEM AND METHOD TO AUGMENT ELECTRONIC DOCUMENTS WITH EXTERNALLY PRODUCED METADATA TO IMPROVE PROCESSING

(71) Applicant: Intuit Inc., Mountain View, CA (US)

(72) Inventors: Wolfgang Paulus, Ramona, CA (US); Luis Felipe Cabrera, Bellevue, WA (US); Mike Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 552 days.

(21) Appl. No.: 16/273,871

(22) Filed: Feb. 12, 2019

Related U.S. Application Data

(62) Division of application No. 14/805,612, filed on Jul. 22, 2015, now Pat. No. 10,210,580.

(51) Int. Cl.
 *G06Q 40/00* (2012.01)
 *G10L 15/00* (2013.01)
 *G06Q 10/06* (2012.01)

(52) U.S. Cl.
 CPC ........... *G06Q 40/12* (2013.12); *G06Q 40/123* (2013.12); *G10L 15/00* (2013.01); *G06Q 10/06* (2013.01)

(58) Field of Classification Search
 CPC ......... G06Q 10/10; G06Q 40/12; G06Q 10/06
 See application file for complete search history.

(56) References Cited

U.S. PATENT DOCUMENTS

| | | | |
|---|---|---|---|
| 7,805,680 B2 * | 9/2010 | Meyers | H04N 21/44222 715/744 |
| 8,095,439 B1 | 1/2012 | Harman et al. | |
| 10,210,580 B1 | 2/2019 | Paulus et al. | |
| 2002/0184196 A1 | 12/2002 | Lehmeier et al. | |
| 2007/0140595 A1 | 6/2007 | Taylor et al. | |
| 2007/0294200 A1 | 12/2007 | Au | |
| 2011/0301934 A1 | 12/2011 | Tardif | |
| 2012/0209839 A1 | 8/2012 | Andrews et al. | |
| 2012/0215669 A1 | 8/2012 | Lieberman et al. | |
| 2013/0290154 A1 | 10/2013 | Cherry et al. | |
| 2016/0267068 A1 | 9/2016 | Nagarajan | |

* cited by examiner

*Primary Examiner* — Allen C Chein
(74) *Attorney, Agent, or Firm* — Paradice and Li LLP

(57) ABSTRACT

A method and system facilitates importation and categorization of financial documents in a financial system. The method and system include receiving source data and externally generated metadata associated with a financial document, such as a receipt of purchase. The method and system further include analyzing the metadata and categorizing the financial document based on the metadata.

22 Claims, 3 Drawing Sheets

SYSTEM AND METHOD TO AUGMENT ELECTRONIC DOCUMENTS WITH EXTERNALLY PRODUCED METADATA TO IMPROVE PROCESSING

RELATED APPLICATION

This application is a divisional application and claims priority to U.S. patent application Ser. No. 14/805,612, filed on Jul. 22, 2015, entitled, "SYSTEM AND METHOD TO AUGMENT ELECTRONIC DOCUMENTS WITH EXTERNALLY PRODUCED METADATA TO IMPROVE PROCESSING," and now U.S. Pat. No. 10,210,580, which is assigned to the assignee hereof. The disclosures of all prior Applications are considered part of and are incorporated by reference in this Patent Application.

BACKGROUND

Managing one's finances for both short term and long term financial security can be very complex, time consuming, and expensive. Effective financial management can include tracking and categorizing all expenditures, navigating confusing tax laws, and tracking investments, banking, loans, and retirement accounts, among other financial concerns. Given the high complexity and cost, it is not surprising that more and more people find it necessary to obtain help, in one form or another, to manage their finances. Financial management systems, such as budgeting, financial transaction management, tax return preparation, and wealth management software programs and applications represent a potentially flexible, highly accessible, and affordable source of financial management assistance. However, traditional financial management systems suffer from drawbacks that lead to wasted time, or even mismanagement of important financial matters.

For instance, traditional financial management systems often lack the ability to properly categorize financial documents, such as receipts of purchase of goods or services, when such financial documents are not in a particular format. For example, when a consumer makes a purchase, the consumer often receives a receipt in paper form, which traditional financial management systems are unable to easily import and categorize. Even if the paper receipt is scanned or photographed so that it is in an electronic form the financial system may not be able to categorize the receipt or read specific expense amounts. This is largely due to the fact that traditional financial management systems rely on analytics methods that are inadequate to recognize the nature of the receipt. Such analytics methods are typically limited to optical character recognition (OCR) that attempts to read the receipt. However, paper receipts that are scanned or photographed are often crumpled or wrinkled and cannot be properly read by OCR. In such a case, a traditional financial management system may fail to categorize the receipt or may mis-categorize the receipt. This can lead to faulty expense categorization and subsequent mismanagement of budgeting. Additionally, the user may fail to deduct purchases that are tax deductible on a tax return or may improperly deduct a purchase that is not tax deductible. Thus, traditional financial management systems do not adequately facilitate the importing and/or categorization of financial documents.

What is needed is a method and system for facilitating the importation and categorization of financial documents in financial management systems.

SUMMARY

Embodiments of the present disclosure address some of the shortcomings associated with traditional financial management systems by providing methods and systems for facilitating import and categorizing of financial documents. In particular, embodiments of the present disclosure utilize externally generated metadata associated with a financial document to assist in the importation and categorization of the financial document. For example, when a user of a financial system provides the financial document to the financial system, the financial system can also receive externally generated metadata related to the financial document. The externally generated metadata can be generated and provided to the financial system by the user. Alternatively, the financial system can receive the externally generated metadata from sources other than the user. The externally generated metadata provides context to or an indication of the nature of the financial document. The financial system analyzes the externally generated metadata associated with the financial document, and sorts the financial document into one or more categories based on the externally generated metadata. In this way, the financial system facilitates the importation and categorization of the financial document.

In one embodiment, the financial system provides an indication to the user that the financial document has been sorted into one or more categories. This indication can be provided to the user at a later time during a financial management interview, such as during a tax return preparation interview or an expense management interview, or at substantially the same time that the financial document is provided to the financial system In one embodiment, the financial document is a receipt of purchase of goods or services. When the user receives the receipt, the user can make an image of the receipt. The user can then generate metadata that provides context to the receipt. The user provides the image of the receipt and the externally generated metadata to the financial system. The financial system then analyzes the metadata and sorts the receipt into one or more categories based on the metadata.

In one embodiment, the metadata can be a brief audio recording describing the receipt. In one example, the user can indicate in the audio recording that the receipt is for the purchase of tax deductible goods or services. The user provides the financial document, or source data representing an electronic version of the financial document, as well as the voice recording to the financial system. The financial system then analyzes the audio recording with a speech recognition engine or other analysis capabilities and sorts the receipt into a category that indicates that the purchase is tax-deductible. Alternatively, the voice recording can indicate that the receipt belongs in one or more expense categories for budget tracking purposes. The financial system can then sort the receipt into the one or more expense categories indicated by the audio recording.

In one embodiment, the externally generated metadata can include a brief video, or image data, made by the user including gestures or signals indicating the nature of the financial document. The financial system can then analyze the video using video analysis techniques that detect and recognize the gestures or signals. The financial system can then sort the financial document into one or more categories based on the analysis of the video.

In one embodiment, the externally generated metadata can include text generated by the user. For example, upon receiving the financial document, or photographing the financial document, the user can write or type a brief note describing the nature of the financial document. The financial system can then analyze the note and sort the financial document into one or more categories based on the note.

The externally generated metadata can also include metadata not generated by the user. For example, the financial system can gather location data from a mobile computing device of the user at the time that the financial document is received. Location data can include cellular phone network data or GPS data, data from communications beacons, such as wifi beacons, Bluetooth beacon and Bluetooth LE beacons, and/or any other sources of data that indicates a location of the user at the time the financial document was received. Thus, if a user makes a purchase at a hardware store and takes a photograph of the receipt received for the purchase, the financial system can gather location data that indicates that the user was at a particular location when the receipt was received. The financial system can then access public or third-party databases to determine that the user was at a particular hardware store when the receipt was received. The financial system can then sort the receipt into an expense category such as home improvement based on the fact that the externally generated metadata indicated that the receipt was received from a hardware store.

In one embodiment, the financial system can prompt the user to provide externally generated metadata anytime that a financial document is provided to the financial system. For example, the financial system can prompt the user to provide a voice recording, a video, a text description or another suitable form of externally generated metadata indicating a characteristic of the financial document when the financial document is provided to the financial system.

In one embodiment, the financial system can include a software application installed on a mobile computing device of the user, such as a smart phone. The user can access the application to take a photograph or video of a financial document. The software application can then prompt the user to provide externally generated metadata related to the financial document. In this way, the financial system can conveniently cause the user to provide externally generated metadata at the time that a financial document is received or photographed.

In one embodiment, the financial system analyzes previous financial documents, previous tax returns, or user history in addition to the externally generated metadata associated with the financial document in order to sort a current financial document into one or more categories. For example, the financial system can analyze how a user has previously characterized other financial documents in order to properly characterize the current financial document.

In one embodiment, the financial system gathers data associated with other users of the financial system and analyzes the data associated with other users in addition to the externally generated metadata in order to properly sort the financial document into one or more categories. For example, the financial system can analyze tax returns or financial documents of other users in order to properly sort the financial document into one or more categories.

In one embodiment the financial system includes a tax return preparation system. During a tax return preparation interview the financial system can indicate to the user that the financial document has been sorted into a particular category based on the externally generated metadata and can prompt the user to check that the categorization is correct. Additionally, in a situation in which the externally generated metadata indicates that a financial document is a receipt for a tax-deductible purchase, but the financial system is unable to recognize the exact numbers on the receipt, the financial system can remind user to review the financial document and enter amount of the expense.

In one embodiment the financial system includes an expense management system. During an expense management interview the financial system can indicate to the user that the financial document has been sorted into one or more categories based on the externally generated metadata and can prompt the user to check that the categorization is correct. Additionally, in a situation in which the externally generated metadata indicates that a financial document is a receipt for the purchase of goods or services in one or more expense categories, but the system is unable to recognize exact numbers on the receipt, the financial system can remind the user to review the financial document and enter the amount of the purchase that fits in each category.

Embodiments of the present disclosure address some of the shortcomings associated with traditional financial systems that do not adequately facilitate the importation and categorization of financial documents. A financial system in accordance with one or more embodiments facilitates importation and categorization of financial documents based on source data that represents the financial document and externally generated metadata that is related to the financial document.

The disclosed embodiments do not encompass, embody, or preclude other forms of innovation in the area of financial management, electronic transaction categorization, tax preparation, data processing. In addition, the disclosed embodiments are not related to any fundamental economic practice and, in fact, are directed to the relatively new technical area of electronic transaction categorization and management, metadata utilization, and data transfer. Consequently, the disclosed embodiments, are not directed to, do not encompass, and are not merely abstract ideas or concepts.

In addition, embodiments of the present disclosure address some of the shortcomings associated with traditional financial systems that do not adequately facilitate the importation and categorization of financial documents. A financial system in accordance with one or more embodiments facilitates the importation and categorization of financial documents based on externally generated metadata related to the financial document. Therefore, the disclosed embodiments provide for significant improvements to the technical fields of electronic transaction categorization, financial management, electronic file management, electronic file submissions, professional services, and time management that results in more efficient use of human and non-human resources, fewer processor cycles being utilized, reduced memory utilization, and less communications bandwidth being utilized to relay data to and from various peer and backend systems.

As a result, computing systems and online services are transformed into faster, more efficient, and more effective computing systems and services by implementing the disclosed embodiments. Therefore, the various described embodiments of the disclosure and their associated benefits amount to significantly more than any abstract idea. In particular, by analyzing externally generated metadata associated with the financial document in order to facilitate the importation and categorization of the financial document into a financial system, users can save money and time and can better manage their wealth and taxes.

Figure 1:
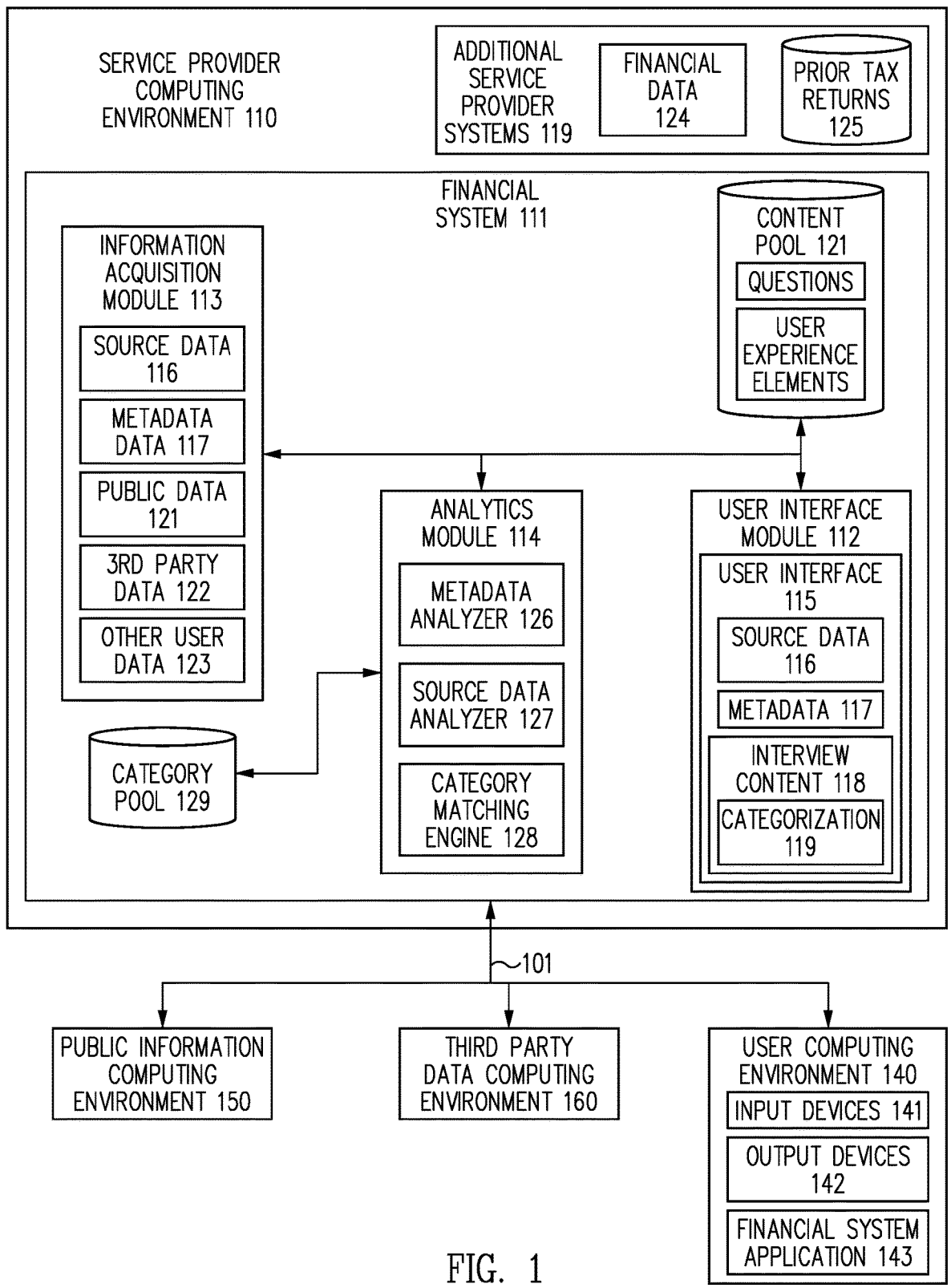
FIG. 1 is a block diagram of software architecture for facilitating importation and categorization of financial documents in a financial system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for facilitating importation and categorization of financial documents into a financial system by analyzing externally generated metadata associated with the financial documents, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed tax return preparation system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "interview" and "interview process" include, but are not limited to, an electronic, software-based, and/or automated delivery of multiple questions to a user and an electronic, software-based, and/or automated receipt of responses from the user to the questions, according to various embodiments.

Hardware Architecture

FIG. 1 illustrates a block diagram of a production environment 100 for facilitating importation and categorization of financial documents into a financial system, according to one embodiment. Embodiments of the present disclosure provide methods and systems for facilitating importation and categorization of financial documents into a financial system, according to one embodiment. The externally generated metadata provides context to the financial document. The financial system analyzes the externally generated metadata associated with the financial document, and sorts the financial document into one or more categories based on the externally generated metadata. The financial system provides an indication to the user that the financial document has been sorted into the one or more categories. In this way, the financial system facilitates the importation and categorization of the financial document.

Embodiments of the present disclosure address some of the shortcomings associated with traditional financial systems that do not adequately facilitate the importation and categorization of financial documents. A financial system in accordance with one or more embodiments facilitates importation and categorization of financial documents based on source data related to the financial document and externally generated metadata related to the financial document. The various embodiments of the disclosure can be implemented to improve the technical fields of user experience, data collection, and data processing. Therefore, the various described embodiments of the disclosure and their associated benefits amount to significantly more than an abstract idea. In particular, by analyzing externally generated metadata associated with the financial document in order to facilitate the importation and categorization of the financial document into a financial system, users can save money and time and can better manage their wealth and taxes.

The production environment 100 includes a service provider computing environment 110, a user computing environment 140, a public information computing environment 150, and a third party data computing environment 160 for facilitating importation and categorization of financial documents in a financial system, according to one embodiment. The computing environments 110, 140, 150, and 160 are communicatively coupled to each other with one or more communication channels 101, according to one embodiment.

The service provider computing environment 110 represents one or more computing systems such as a server, a computing cabinet, and/or distribution center that is configured to receive, execute, and host one or more financial systems (e.g., applications) for access by one or more users, for facilitating importation and categorization of financial documents in a financial system, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a financial system 111, which is configured to facilitate the importation and categorization of financial documents into the financial system.

According to one embodiment, the financial system 111 is a personal financial management system. More particularly, the financial system 111 can be a tax return preparation system, an expense management system, a financial transaction management system, or a system that manages one or more of banking, investments, loans, credit cards, real estate investments, retirement planning. The financial system 111 can be a standalone system that facilitates the importation and categorization of financial documents. Alternatively, the financial system 111 can be integrated into other software or service products provided by a service provider.

The financial system 111 receives source data representing a financial document and externally generated metadata, analyzes the metadata, and categorizes the financial document into one or more categories based on the metadata, according to one embodiment. The financial system 111 includes various components, databases, engines, modules, and/or data to facilitate the importation and categorization of financial documents, according to one embodiment.

The financial system 111 includes a user interface module 112, an information acquisition module 113, and an analytics module 114, according to one embodiment.

The user interface module 112 guides a user through a series of financial topics by asking questions or by inviting the user to provide data related to financial topics selected by the user. The user interface module 112 includes a user interface 115, according to one embodiment. The user interface 115 receives source data 116 and externally generated metadata 117 from a user, according to one embodiment. The source data 116 is an electronic version of a financial document. The metadata 117 includes information indicating an attribute, characteristic, or purpose of the financial document represented by the source data 116. The user interface module 112 populates interview content 118 from a content pool 121, which includes a number of questions and/or financial topics that can be presented with one or more user experience elements, according to one embodiment. The user experience elements include, but are not limited to, buttons, slides, dialog boxes, text boxes, drop-down menus, banners, tabs, directory trees, links, audio content, video content, and/or other multimedia content for facilitating importation and categorization of the financial document represented by the source data 116 in the financial system 111 as well as for assisting the user in other financial management aspects such as preparing a tax return or monitoring expenses. The interview content 118 also includes a categorization 119 indicating one or more categories into which the financial document represented by the source data 116 has been sorted.

The user computing environment 140 includes input devices 141 and output devices 142 for communicating with the tax filer, and a financial system application 143, according one embodiment. The input devices 141 include, but are not limited to, keyboards, mice, microphones, cameras, touchpads, touchscreens, digital pens, and the like. The output devices 142 include, but are not limited to, speakers, monitors, touchscreens, and the like. The financial system application 143 can include financial system software stored on a computing device of the user computing environment 140.

Returning to the financial system 111, the user interface module 112 is configured to receive source data from the user, or user computing environment 140, representing a financial document. The user interface module 112 also receives externally generated metadata 117 related to the financial document, according to one embodiment. The source data 116 includes an electronic representation of a financial document, such as, but not limited to, a receipt for the purchase of goods or services, a credit card statement, a loan document, a document related to an investment, a document related to a retirement plan, or other types financial documents. The source data can include a photograph or digital image of the financial document, a scan of the financial document, or any other electronic representation of a financial document. The externally generated metadata 117 is data that provides context to or indicates a characteristic of the financial document represented by the source data 116 and can include a voice recording, a video recording, text, a photograph or image data, location data such as cellular network data or GPS data, data from communications beacons, such as wifi beacons, Bluetooth beacon and Bluetooth LE beacons, and/or any other sources of data that can provide an indication of a characteristic or purpose of the financial document represented by the source data 116.

The information acquisition module 113 is configured to acquire additional information from various sources to merge with or supplement the source data 116 and the externally generated metadata 117, according to one embodiment. For example, the information acquisition module 113 is configured to gather public data 121, third-party data 122, and other user data 123 that can provide additional information about one or more category into which the financial document should be sorted. The other user data 123 can include prior tax returns 125 or financial data 124 associated with the user or other users of the financial system 111. For example, the information acquisition module 113 is configured to communicate with additional service provider systems 119, e.g., a tax return preparation system, an expense management system, or other financial management system, to access the financial data 124 and/or prior tax returns 125, according to one embodiment. The information acquisition module 113 imports relevant portions of the financial data 124 and the prior tax returns 125 into the financial system 111 as other user data 123 and, for example, saves local copies into one or more databases, according to one embodiment.

The information acquisition module 113 is configured to acquire additional data related to the source data 116 in the metadata 117 from the public information computing environment 150 according to one embodiment. The public data 121 can be gathered from public record searches of tax records, public information databases, public maps, property ownership records, and other public sources of information. The information acquisition module 113 can also acquire data from sources such as social media websites, such as Twitter, Facebook, LinkedIn, and the like.

The information acquisition module 113 is configured to acquire third-party data 122 from the third party data computing environment 160, according to one embodiment. For example, the information acquisition module 113 requests and receives third-party data 122 from the third party data computing environment 160 to supply or supplement the employment data the metadata 117, according to one embodiment. In one embodiment, the third party data computing environment 160 is configured to automatically transmit data to the financial system 111 (e.g., to the information acquisition module 113), to be merged into the third-party data 122 and the metadata 117. The third party data computing environment 160 can include, but is not limited to, financial service providers, state institutions, federal institutions, $3^{rd}$ party databases that provide location data or data indicating a business or type of business that operates at a particular location, financial institutions, social media, and any other business, organization, or association that has maintained, that currently maintains, or which may in the future maintain data relevant to the categorization of the financial document represented by the source data 116, according to one embodiment.

The financial system 111 uses the information acquisition module 113 to acquire the third-party data 122 and the tax data 123 and to supplement the source data 116 and the metadata 117, according to one embodiment. The information acquisition module 113 is configured to request and receive data from the additional service provider systems 119, from the public information computing environment 150, and from the third party data computing environment 160, according to various embodiments.

In one embodiment, the additional service provider systems 119 include a tax return preparation system. In one embodiment, the information acquisition module 113 is configured to acquire prior tax returns 125, for use by the financial system 111 in categorizing the financial document represented by the source data 116, according to one embodiment. Because the financial services provider provides both the financial system 111 and, for example, a tax return preparation system, the service provider computing environment 110 can be configured to share tax-related information and/or financial data such as other users' expense categorization data between the various systems. By interfacing with the additional service provider systems 119, the information acquisition module 113 can collect tax and financial data that can supplement the externally generated metadata 117.

The additional service provider systems 119 can also include financial services other than return preparation systems. For example, the additional service provider systems can include personal financial management systems that manage one or more of banking, investments, credit cards, loans, retirement accounts, budgeting, or financial interests. The information acquisition module 113 can gather information about other users to supplement the externally generated metadata 117.

The financial system 111 uses the analytics module 114 to analyze the metadata 117 in order to sort a financial document represented by the source data 116 in the one or more categories, according to one embodiment. In particular, the externally generated metadata 117 includes information that provides context to or describes an attribute or purpose of the financial document represented by the source data 116. The analytics module 114 analyzes the metadata 117 and sorts the financial document into one or more categories based on the metadata 117. The analytics module 114 can also analyze the source data 116, public data 121, the third-party data 122, and the other user data 123 in order to sort the financial document represented by the source data 116 into one or more categories.

The analytics module 114 includes a metadata analyzer 126, a source data analyzer 127, and a category matching engine 128, according to one embodiment. The analytics module 114 receives the metadata 117 from the information acquisition module 113 or directly from the user interface module 112. The metadata analyzer 126 analyzes the metadata 117. The metadata analyzer 126 can include one or more analysis engines such as speech recognition engines, video analysis engines, text analysis engines, location data analysis engines, image analysis engines, or any other suitable engines for analyzing the metadata 117. After the metadata 117 has been analyzed, the category matching engine 128 matches the financial document represented by the source data 116 to one or more categories from the category pool 129.

In one embodiment, the analytics module 114 uses the source data analyzer 127 to analyze the source data 116 representing the financial document. The category matching engine 128 matches the financial document 116 to the one or more categories based on both the metadata 117 and the source data 116. The source data analyzer 127 can use one or more processes such as OCR to analyze the source data 116 to assist in matching the financial document represented by the source data 116 to the one or more categories.

In one embodiment, the financial document represented by the source data 116 is a receipt for the purchase of goods or services. The user interface module 112 receives source data 116 representing the receipt. The source data 116 can be one or more photographs of the receipt, a video of the receipt, a PDF of the receipt, or any other electronic representation of the receipt. The user provides metadata 117 to the user interface module 112 together with the source data 116. The metadata 117 includes information that indicates a characteristic, attribute, or purpose of the receipt. For example, the metadata 117 can include an indication that the receipt fits into one or more tax categories, one or more expense categories, one or more financial management categories or other categories. The analytics module 114 analyzes the metadata 117 and identifies one or more of an attribute, characteristic, or purpose of the receipt. The category matching engine 128 then matches the receipt to one or more categories.

In one example, a user purchases computer equipment from an electronics store for a business that the user owns. When the user receives the receipt for the purchase, the user takes an image of the receipt, such as with a digital camera or a scanner. After the user takes an image of the receipt the user makes a short audio recording indicating that the receipt is for items purchased for her business and that the purchase is tax-deductible. The audio recording can also include other information regarding the importance of the document. The user then submits the image of the receipt as source data 116 and the audio recording as metadata 117 to the financial system 111. The analytics module 114 uses the metadata analyzer 126 to analyze the audio recording with a speech recognition engine. The category matching engine 128 then sorts the receipt represented by the source data 116 into a category indicating that the source data 116 is tax-deductible. Alternatively, or additionally, the category matching engine 128 also sorts the receipt represented by the source data 116 into a business expense category for purposes of expense tracking and budgeting. Later, when the user is preparing her taxes the user interface module 112 provides interview content 118 that indicates that the receipt has been categorized as a tax-deductible business expense. Alternatively, or additionally, when the user engages the financial system 111 for the purpose of monitoring expenses or budgeting, the user interface module 112 provides an indication to the user that the receipt has been categorized as a business expense.

In one embodiment, the metadata 117 can include a video made by a user. In particular, when the user receives the financial document, the user can make a brief video including gestures or symbols that indicate one or more characteristics or attributes of the financial document. For example, in the video the user can make hand signals or signs that indicate that the financial document represents a home-improvement expense, a food expense, and entertainment expense, a tax deductible expense, or other categorizations. The user then submits the video file as metadata 117 to the financial system 111 with the source data 116 that represents the financial document. The analytics module 114 then analyzes the video file with the metadata analyzer 126 using video or image recognition engines that interpret the gestures, signs, symbols, or imagery included in the video file indicating the nature or characteristics of the financial document represented by the source data 116. The category matching engine 128 then matches the receipt to one or more categories from the category pool 129 based on the analysis of the video file. At a later time, or even substantially immediately after submitting the source data 116 and the metadata 117, the user interface module 112 can provide an indication to the user that the financial document has been sorted into the one or more categories in accordance with the video file.

In one embodiment, the externally generated metadata 117 can include text entered by the user. For example, upon submitting the source data 116 representing a financial document to the financial system 111, the user can create a brief text file that includes information indicating the nature of the financial document. For example, the text file can include data indicating that the financial document represents a receipt from a grocery store and should be categorized as a food expense and not tax-deductible. The analytics module 114 then analyzes the text file with the metadata analyzer 126 and interprets the text indicating the nature or characteristics of the financial document represented by the source data 116. The category matching engine 128 then matches the receipt to a food expense category. At a later time, or even substantially immediately after submitting the source data 116 and the metadata 117, the user interface module 112 can provide an indication to the user that the financial document has been sorted into the food expense category and the non-tax-deductible category.

In one embodiment, metadata 117 can include location data extracted from the user computing environment 140. For example, if the user visits a doctor's office for medical care and receives a receipt for a co-pay from the doctor's office, the user can take a picture of the receipt and submit the picture to the financial system 111 as source data 116 representing the receipt. The financial system 111 can query the user computing environment 140 for location data related to a location at which the user received the receipt. The financial system 111 can receive from the user computing environment 140 GPS coordinates or cellular network data, data from communications beacons, such as wifi beacons, Bluetooth beacon and Bluetooth LE beacons, and/or any other sources of data indicating the location at which the image of the receipt was made. The information acquisition module 113 can then acquire information from the public information computing environment 150 or from the third-party data computing environment 160 indicating that the location data corresponds to the location of a doctor's office. The financial system 111 then sorts the source data 116 into a medical expenses category and provides an indication to the user via the user interface module 112 that the receipt has been categorized as a medical expense.

In one embodiment, when the user submits the source data 116 to the financial system 111, the user can take a photograph of the location at which the financial document is received. The user then submits the photograph of the location as metadata 117 to the financial system 111. The analytics module 114 analyzes the photograph and extracts information from the photograph, such as a name of the store from which the financial document was received. The analytics module 114 determines that the store corresponds to a hardware store and categorizes the source data 116 representing the financial document as a home-improvement expense. The user interface 112 provides an indication to the user that the financial document has been categorized as a home-improvement expense.

In one embodiment, the financial system 111 can prompt the user to provide externally generated metadata anytime source data 116 representing a financial document is provided to the financial system 111. For example, the financial system 111 can prompt the user to provide a voice recording, a video, a text description, location data, or another suitable form of externally generated metadata indicating a characteristic of the financial document when the financial document is provided to the financial system 111. The user can then provide the metadata 117 with the source data 116 and the financial system 111 can analyze the metadata 117 and sort the financial document into one or more categories.

In one embodiment, the financial system can include a financial system application 143 installed on a mobile computing device of the user computing environment 140. The user can access the application to take a photograph or video of a financial document. The financial system application 143 can then prompt the user to provide externally generated metadata related to the financial document. In this way, the financial system can conveniently cause the user to provide externally generated metadata at the time a financial document is received or photographed. The financial system application 143 can include access to the computing device's camera so the image can be taken from the financial system application 143 instead of from a generic camera application of the user computing device. Thus, anytime the user accesses the financial system application 143 to take a picture as opposed to accessing the standard camera application, the financial system application 143 can prompt the user to provide metadata 117 to the financial system 111. Alternatively, the financial system application 143 can retrieve metadata 117, such as location data, without any further action from the user.

In one embodiment, the analytics module 114 analyzes previously financial documents of the user or other users, previous tax returns of the user or other users, or user history in addition to the externally generated metadata 117 in order to sort a current financial document into one or more categories. This data corresponds to other user data 123, the third party data 122, and/or the public data 121 acquired by the information acquisition module 113. With this information, the analytics module 114 can analyze how the user or other users have previously characterized other financial documents in expense management or tax return preparation scenarios in order to properly characterize the current financial document.

In one embodiment, the source data analyzer 127 extracts specific expense amounts from the source data 116. In this case, the financial system 111 can enter the specific expense amounts into the tax return or into a budget management table in addition to sorting the source data 116 into one or more categories. In this case, when the financial system 111 provides a tax return preparation interview or an expense management interview, the user interface module 112 can indicate to the user that the financial document has been sorted into the one or more categories and the expense amounts have been as well. In this case, the user may or may not wish to access the source data 116 to check that the categorization and the expense amounts are correct. In some cases, the analytics module 114 may not be able to successfully extract specific expense amounts from the source data 116. In this case, the user interface module 112 can indicate during a tax return preparation interview or an expense management interview that the source data 116 has been sorted into the one or more categories based on the metadata 117, but that the user will need to access the source data 116 to manually enter the specific expense amounts. The user interface module 112 can conveniently provide a link to the source data 116 for the user to view and enter the particular expense amounts.

The disclosed embodiments do not encompass, embody, or preclude other forms of innovation in the area of financial management, electronic transaction categorization, tax preparation, data processing. In addition, the disclosed embodiments are not related to any fundamental economic practice and, in fact, are directed to the relatively new technical area of electronic transaction categorization, metadata utilization, and data transfer. Consequently, the disclosed embodiments, are not directed to, do not encompass, and are not merely abstract ideas or concepts.

In addition, embodiments of the present disclosure address some of the shortcomings associated with traditional financial systems that do not adequately facilitate the importation and categorization of financial documents. A financial system in accordance with one or more embodiments facilitates the importation and categorization of financial documents based on externally generated metadata related to the financial document. Therefore, the disclosed embodiments provide for significant improvements to the technical fields of electronic transaction categorization, financial management, electronic file management, electronic file submissions, professional services, and time management that results in more efficient use of human and non-human resources, fewer processor cycles being utilized, reduced memory utilization, and less communications bandwidth being utilized to relay data to and from various peer and backend systems.

As a result, computing systems and online services are transformed into faster, more efficient, and more effective computing systems and services by implementing the disclosed embodiments. Therefore, the various described embodiments of the disclosure and their associated benefits amount to significantly more than an abstract idea. In particular, by analyzing externally generated metadata associated with the financial document in order to facilitate the importation and categorization of the financial document into a financial system, users can save money and time and can better manage their wealth and taxes.

Process

Figure 2:
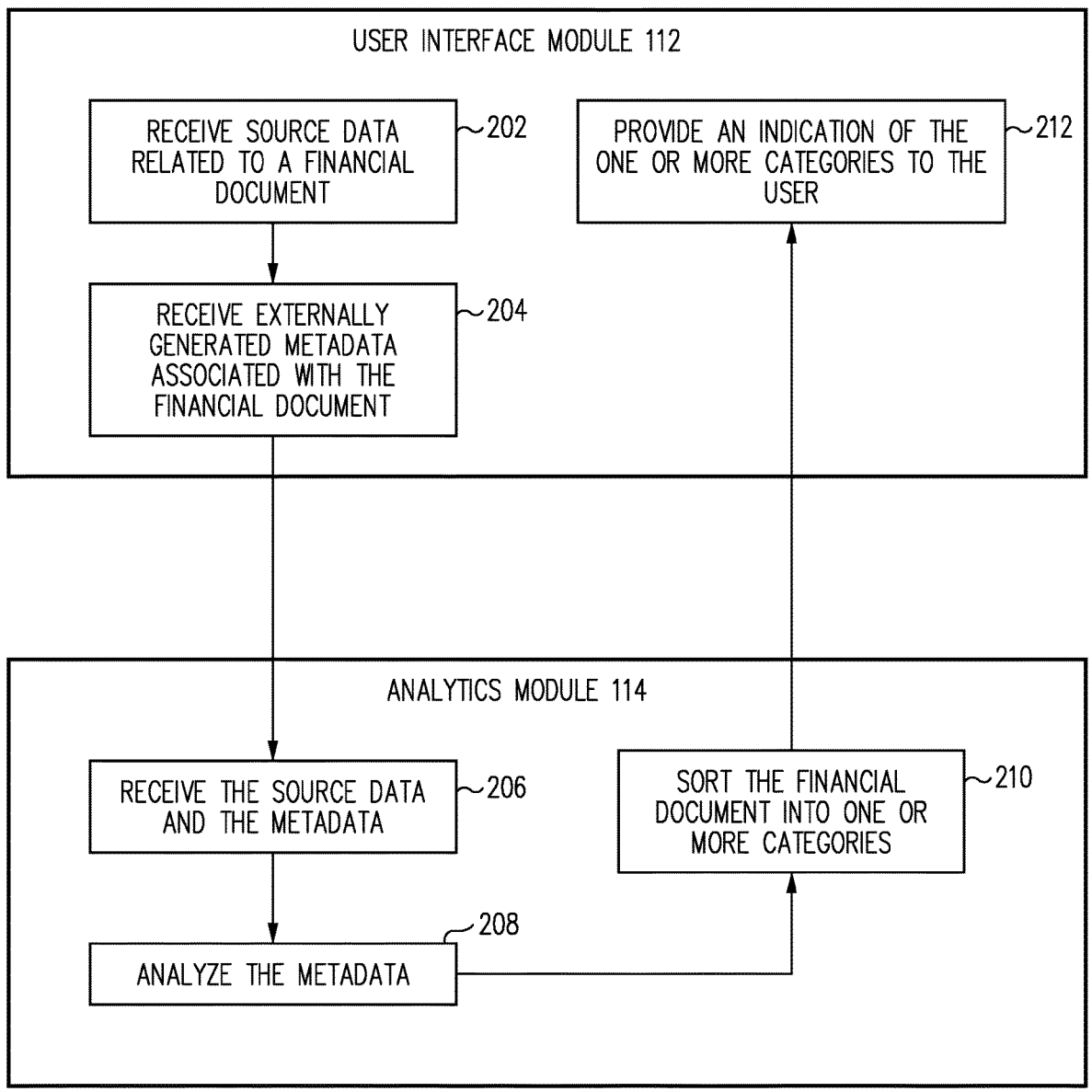
FIG. 2 is a block diagram of a process for facilitating importation and categorization of financial documents in a financial system, in accordance with one embodiment.

FIG. 2 illustrates a functional flow diagram of a process 200 for facilitating importation of financial documents into a financial system, in accordance with one embodiment.

At block 202, the user interface module 112 receives source data related to a financial document. The financial document can include a receipt of purchase of goods or services, according to one embodiment. The source data can include an image or other representation of the financial document, according to one embodiment. The process proceeds to block 204.

At block 204, the user interface module 112 receives externally generated metadata associated with the financial document. The externally generated metadata can include data generated by an owner of the financial document or a user of the financial system and can describe an attribute of the financial document. From block 204, the process proceeds to block 206.

At block 206 the analytics module 114 receives the source data and the metadata from the user interface module 112. From block 206, the process proceeds to block 208.

At block 208, the analytics module analyzes the metadata. From block 208, the process proceeds to block 210.

At block 210, the analytics module 114 sorts the financial document into one or more categories, according to one embodiment. The analytics module sorts the financial document into one or more categories based on the analysis of the metadata and the source data, according to one embodiment. From block 210, the process proceeds to block 212.

At block 212, the user interface provides an indication of the one or more categories to the user, according to one embodiment.

Although a particular sequence is described herein for the execution of the process 200, other sequences can also be implemented.

Figure 3:
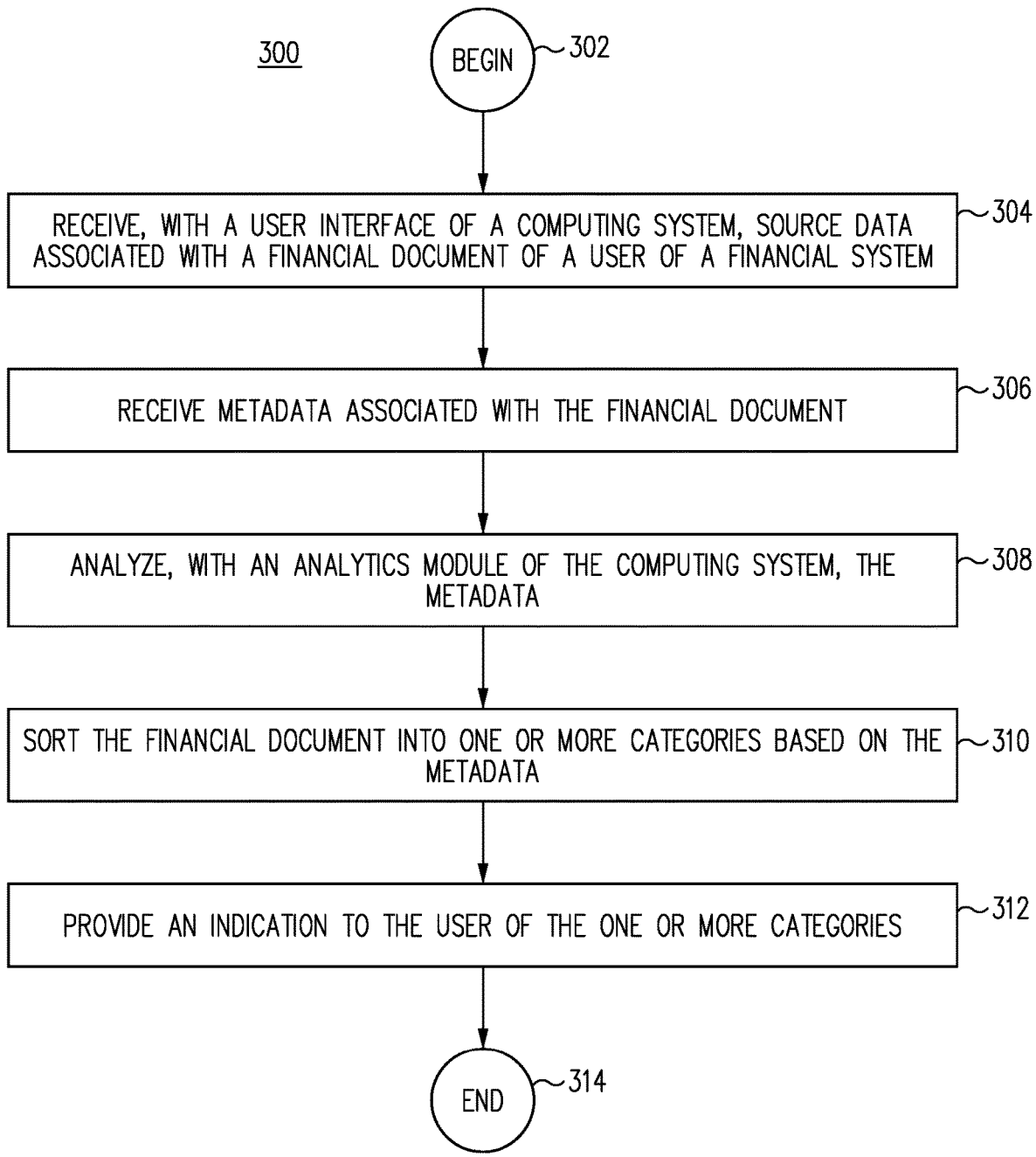
FIG. 3 is a flow diagram of a process for facilitating importation and categorization of financial documents in a financial system, in accordance with one embodiment.

FIG. 3 illustrates a flow diagram of a process 300 for facilitating the importation and categorization of financial documents into a financial system, according to various embodiments.

In one embodiment, process 300 for facilitating the importation and categorization of financial documents into a financial system begins at BEGIN 302 and process flow proceeds to RECEIVE, WITH A USER INTERFACE OF A COMPUTING SYSTEM, SOURCE DATA ASSOCIATED WITH A FINANCIAL DOCUMENT OF A USER OF A FINANCIAL SYSTEM 304.

In one embodiment, at RECEIVE, WITH A USER INTERFACE OF A COMPUTING SYSTEM, SOURCE DATA ASSOCIATED WITH A FINANCIAL DOCUMENT OF A USER OF A FINANCIAL SYSTEM 304 process 300 for facilitating the importation and categorization of financial documents into a financial system receives, with a user interface of a computing system, source data associated with a financial document of a user of a financial system.

In one embodiment, once process 300 for facilitating the importation and categorization of financial documents into a financial system receives, with a user interface of a computing system, source data associated with a financial document of a user of a financial system at RECEIVE, WITH A USER INTERFACE OF A COMPUTING SYSTEM, SOURCE DATA ASSOCIATED WITH A FINANCIAL DOCUMENT OF A USER OF A FINANCIAL SYSTEM 304 process flow proceeds to RECEIVE METADATA ASSOCIATED WITH THE FINANCIAL DOCUMENT 306.

In one embodiment, at RECEIVE METADATA ASSOCIATED WITH THE FINANCIAL DOCUMENT 306, process 300 for facilitating the importation and categorization of financial documents into a financial system receives metadata associated with the financial document.

In one embodiment, once process 300 for facilitating the importation and categorization of financial documents into a financial system receives metadata associated with the financial document at RECEIVE METADATA ASSOCIATED WITH THE FINANCIAL DOCUMENT 306, process flow proceeds to ANALYZE, WITH AN ANALYTICS MODULE OF THE COMPUTING SYSTEM, THE METADATA 308.

In one embodiment, at ANALYZE, WITH AN ANALYTICS MODULE OF THE COMPUTING SYSTEM, THE METADATA 308, process 300 for facilitating the importation and categorization of financial documents into a financial system analyzes, with an analytics module of the computing system, the metadata, according to one embodiment.

In one embodiment, once process 300 for facilitating the importation and categorization of financial documents into a financial system analyzes, with an analytics module of the computing system, the metadata at ANALYZE, WITH AN ANALYTICS MODULE OF THE COMPUTING SYSTEM, THE METADATA 308, process flow proceeds to SORT THE FINANCIAL DOCUMENT INTO ONE OR MORE CATEGORIES BASED ON THE METADATA 310.

In one embodiment, at SORT THE FINANCIAL DOCUMENT INTO ONE OR MORE CATEGORIES BASED ON THE METADATA 310 the process 300 sorts the financial document into one or more categories based on the metadata.

In one embodiment, once process 300 sorts the financial document into one or more categories based on the metadata at SORT THE FINANCIAL DOCUMENT INTO ONE OR MORE CATEGORIES BASED ON THE METADATA 310, process flow proceeds to PROVIDE AN INDICATION TO THE USER OF THE ONE OR MORE CATEGORIES 312.

In one embodiment, at PROVIDE AN INDICATION TO THE USER OF THE ONE OR MORE CATEGORIES 312 the process 300 for facilitating the importation and categorization of financial documents into a financial system provides an indication to the user of the one or more categories.

In one embodiment, once the process 300 for facilitating the importation and categorization of financial documents into a financial system provides an indication to the user of the one or more categories at PROVIDE AN INDICATION TO THE USER OF THE ONE OR MORE CATEGORIES 312, process flow process flow proceeds to END 314.

In one embodiment, at END 314 the process for facilitating the importation and categorization of financial documents into a financial system is exited to await new data and/or instructions. As noted above, the specific illustrative examples discussed above are but illustrative examples of implementations of embodiments of the method or process for facilitating the importation and categorization of financial documents into a financial system. Those of skill in the art will readily recognize that other implementations and embodiments are possible. Therefore the discussion above should not be construed as a limitation on the claims provided below.

In one embodiment, a computing system implemented method facilitates import of financial records of a user of a financial system. The method includes receiving, with a user interface of a computing system, source data associated with a financial document of a user of a financial system and receiving externally generated metadata associated with the financial document. The method further includes analyzing, with an analytics module of the computing system, the metadata, sorting, with the analytics module, the financial document into one or more categories based on the metadata, and providing an indication to the user of the one or more categories.

In one embodiment, a system facilitates import of financial records of a user of a financial system. The system includes at least one processor and at least one memory coupled to the at least one processor. The at least one memory has stored therein instructions which, when executed by any set of the one or more processors, perform a process that includes receiving, with a user interface of a computing system, source data associated with a financial document of a user of a financial system and receiving externally generated metadata associated with the financial document. The process further includes analyzing, with an analytics module of the computing system, the metadata, sorting, with the analytics module, the financial document into one or more categories based on the metadata, and providing an indication to the user of the one or more categories.

One embodiment is a non-transitory computer-readable medium having a plurality of computer-executable instructions which, when executed by a processor, perform a method for facilitating the importation and categorization of financial records of a user of a financial system. The instructions include a user interface module configured to receive source data representing a financial document of a user and externally generated metadata associated with the financial document. The instructions further include an analytics module configured to analyze the metadata and to sort the financial document into one or more categories based on the metadata, the user interface module being configured to provide an indication of the one or more categories to the user.

The disclosed embodiments do not encompass, embody, or preclude other forms of innovation in the area of financial management, electronic transaction categorization, tax preparation, data processing. In addition, the disclosed embodiments are not related to any fundamental economic practice and, in fact, are directed to the relatively new technical area of electronic transaction categorization and management, metadata utilization, and data transfer. Consequently, the disclosed embodiments, are not directed to, do not encompass, and are not merely abstract ideas or concepts.

In addition, embodiments of the present disclosure address some of the shortcomings associated with traditional financial systems that do not adequately facilitate the importation and categorization of financial documents. A financial system in accordance with one or more embodiments facilitates the importation and categorization of financial documents based on externally generated metadata related to the financial document. Therefore, the disclosed embodiments provide for significant improvements to the technical fields of electronic transaction categorization, financial management, electronic file management, electronic file submissions, professional services, and time management that results in more efficient use of human and non-human resources, fewer processor cycles being utilized, reduced memory utilization, and less communications bandwidth being utilized to relay data to and from various peer and backend systems.

As a result, computing systems and online services are transformed into faster, more efficient, and more effective computing systems and services by implementing the disclosed embodiments. Therefore, the various described embodiments of the disclosure and their associated benefits amount to significantly more than any abstract idea. In particular, by analyzing externally generated metadata associated with the financial document in order to facilitate the importation and categorization of the financial document into a financial system, users can save money and time and can better manage their wealth and taxes.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for mapping an electronic document from a system user into one or more categories, the method performed by one or more processors of a mapping system including a user interface and comprising:
   receiving, from a system user via the user interface, source data representative of an electronic document associated with a transaction between the system user and a particular establishment;
   receiving, from the system user via the user interface, externally generated metadata associated with the electronic document, the externally generated metadata including image data representative of an image of the particular establishment;
   analyzing the image data using an analytics module of the mapping system, the analyzing including recognizing, using an image recognition engine, at least one of a sign or a symbol in the image;
   extracting location information from the image based on interpreting, using the analytics module, the at least one sign or symbol;
   determining, using the analytics module, a name of the particular establishment based on the location information;
   determining, using the analytics module, that the name of the particular establishment corresponds to a particular category;
   mapping, using a mapping engine of the mapping system, the electronic document into one or more categories based on the particular category;
   importing the electronic document into the mapping system based on the mapping; and
   providing an indication of the mapping to the system user.

2. The method of claim 1, wherein the electronic document is a receipt for a purchase of goods or services from the particular establishment.

3. The method of claim 1, wherein mapping the electronic document into one or more categories includes:
   sorting the electronic document into a tax category.

4. The method of claim 1, wherein the externally generated metadata further includes audio data representative of an audio recording describing the electronic document.

5. The method of claim 4, wherein the analyzing further includes:
   recognizing, using a speech recognition engine, one or more attributes of the electronic document in the audio recording.

6. The method of claim 1, wherein the externally generated metadata includes location data indicative of a location of the system user at a time when the electronic document is received, the location data including at least one of Global Positioning System (GPS) coordinates, cellular network location data, a Wi-Fi Service Set Identifier (SSID), Bluetooth beacon identification data, or short range radio transmission data.

7. The method of claim 6, wherein the location data is retrieved from a mobile computing device of the system user at the time when the electronic document is received.

8. The method of claim 6, wherein the location data is retrieved from at least one of a public database or a third-party database.

9. The method of claim 1, further comprising:
   prompting, via the user interface, the system user to provide at least a portion of the externally generated metadata.

10. The method of claim 1, wherein the externally generated metadata is received from a mobile computing device of the system user.

11. The method of claim 1, wherein the externally generated metadata further includes audio data representative of a voice recording describing the electronic document, the analyzing further including:
    converting the voice recording into digital text; and
    recognizing, using a character recognition engine, one or more attributes of the electronic document based on the digital text.

12. The method of claim 1, wherein the externally generated metadata further includes a text entry, provided by the system user via the user interface, describing the electronic document.

13. The method of claim 1, further comprising:
    adjusting a content of a tax return preparation interview associated with the system user based on the externally generated metadata.

14. The method of claim 1, wherein the externally generated metadata further includes at least one of a gesture or a signal made by the system user and indicating a context of the electronic document.

15. A system comprising:
    one or more processors; and
    at least one memory coupled to the one or more processors and storing instructions that, when executed by the one or more processors, cause the system to perform operations including:
       receiving, from a system user via a user interface of the system, source data representative of an electronic document associated with a transaction between the system user and a particular establishment;
       receiving, from the system user via the user interface, externally generated metadata associated with the electronic document, the externally generated metadata including image data representative of an image of the particular establishment;
       analyzing the image data using an analytics module of the system, the analyzing including recognizing, using an image recognition engine, at least one of a sign or a symbol in the image;
       extracting location information from the image based on interpreting, using the analytics module, the at least one sign or symbol;
       determining, using the analytics module, a name of the particular establishment based on the location information;
       determining, using the analytics module, that the name of the particular establishment corresponds to a particular category;
       mapping, using a mapping engine of the system, the electronic document into one or more categories based on the particular category;
       importing the electronic document into the system based on the mapping; and
       providing an indication of the mapping to the system user.

16. The system of claim 15, wherein the electronic document is a receipt for a purchase of goods or services from the particular establishment.

17. The system of claim 15, wherein the externally generated metadata further includes audio data representative of an audio recording describing the electronic document.

18. The system of claim 15, wherein the externally generated metadata includes location data indicative of a location of the system user at a time when the electronic document is received, the location data including at least one of Global Positioning System (GPS) coordinates, cellular network location data, a Wi-Fi Service Set Identifier (SSID), Bluetooth beacon identification data, or short range radio transmission data.

19. The system of claim 15, wherein the externally generated metadata further includes audio data representative of a voice recording describing the electronic document, the analyzing further including:
   converting the voice recording into digital text; and
   recognizing, using a character recognition engine, one or more attributes of the electronic document based on the digital text.

20. The system of claim 15, wherein the externally generated metadata further includes a text entry, provided by the system user via the user interface, describing the electronic document.

21. The system of claim 15, wherein execution of the instructions causes the system to perform operations further including:
   adjusting a content of a tax return preparation interview associated with the system user based on the externally generated metadata.

22. The system of claim 15, wherein the externally generated metadata further includes at least one of a gesture or a signal made by the system user and indicating a context of the electronic document.

* * * * *